United States Patent [19]

Tomczak et al.

[11] Patent Number: 4,570,118

[45] Date of Patent: Feb. 11, 1986

[54] ANGULAR POSITION TRANSDUCER INCLUDING PERMANENT MAGNETS AND HALL EFFECT DEVICE

[75] Inventors: Lawrence W. Tomczak, Rochester; Anthony J. Osladil, Wyandotte, both of Mich.

[73] Assignee: Gulf & Western Manufacturing Company, Southfield, Mich.

[21] Appl. No.: 323,261

[22] Filed: Nov. 20, 1981

[51] Int. Cl.[4] .................. G01B 7/14; G01R 33/06
[52] U.S. Cl. .................... 324/208; 324/251; 123/617
[58] Field of Search ............ 324/207, 208, 251, 173, 324/174, 235; 73/DIG. 3; 338/32 H; 123/617, 618

[56] References Cited

U.S. PATENT DOCUMENTS

| | | | |
|---|---|---|---|
| 3,112,464 | 11/1963 | Ratajski et al. | 338/32 H |
| 3,118,108 | 1/1964 | Zoss et al. | 324/251 |
| 3,482,163 | 12/1969 | Peck et al. | 324/251 |
| 3,818,292 | 6/1974 | Berman | 318/139 |
| 4,156,191 | 5/1979 | Knight et al. | 324/202 |

OTHER PUBLICATIONS

Wheelack, "A Linear Output Hall Effect Transducer . . .", 2/1981 SAE Technical Paper Series 810379, pp. 23-27.

Primary Examiner—Gerard R. Strecker
Assistant Examiner—Walter E. Snow
Attorney, Agent, or Firm—Body, Vickers & Daniels

[57] ABSTRACT

A transducer for creating an electrical signal proportional to the angular position of a member pivotally mounted on a given axis, which transducer comprises an element pivoted directly by the member and containing a means for creating a flux field linearly varying in intensity along a given operating line extending in an air gap between spaced portions and having a preselected arcuate shape. A linear Hall Effect device, with an output voltage proportional to the intensity of the flux field to which the device is exposed, is mounted at a fixed position on the operating line and in the air gap. Consequently, as the element is pivoted by the monitored member, the output voltage from the Hall Effect device varies proportionally to the position of the Hall Effect device along the operating line.

2 Claims, 17 Drawing Figures

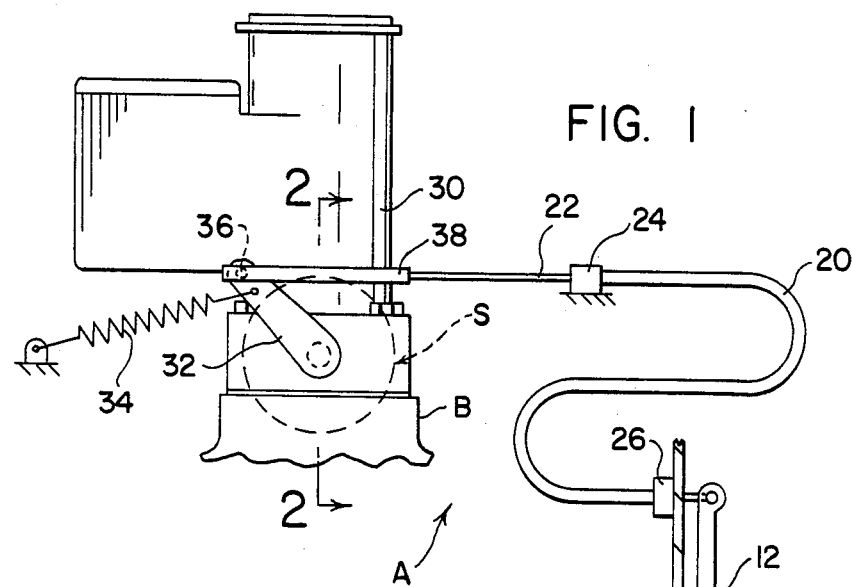
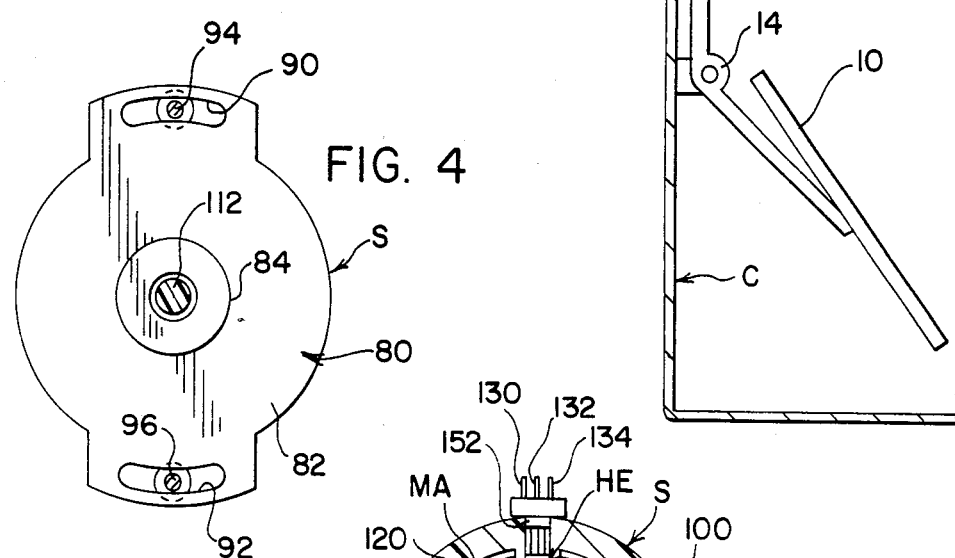
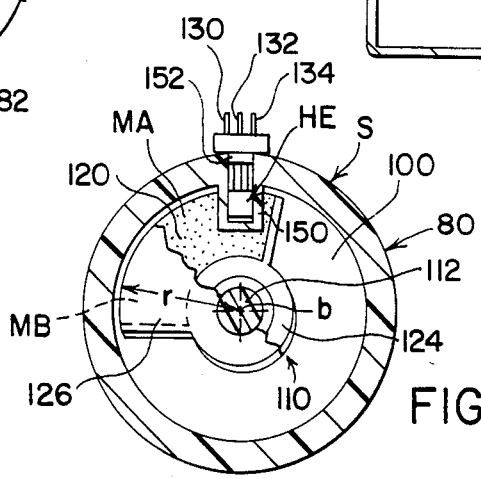

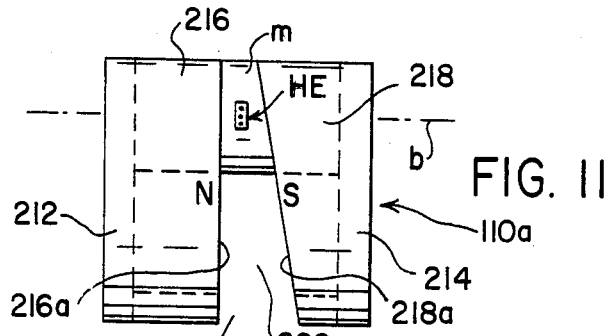
FIG. 11
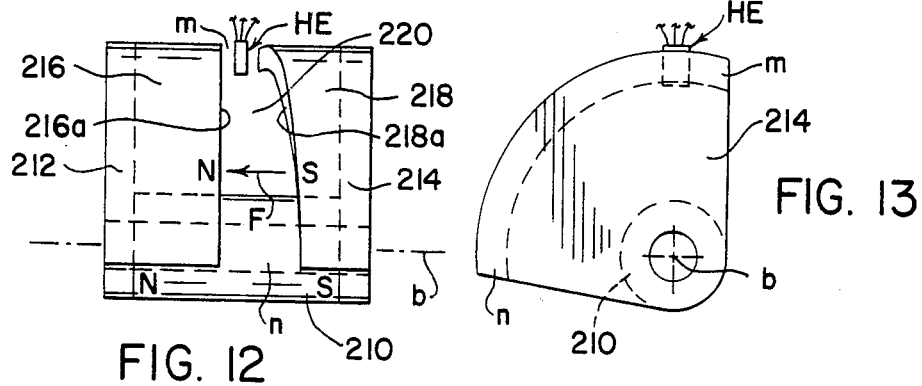
FIG. 12
FIG. 13
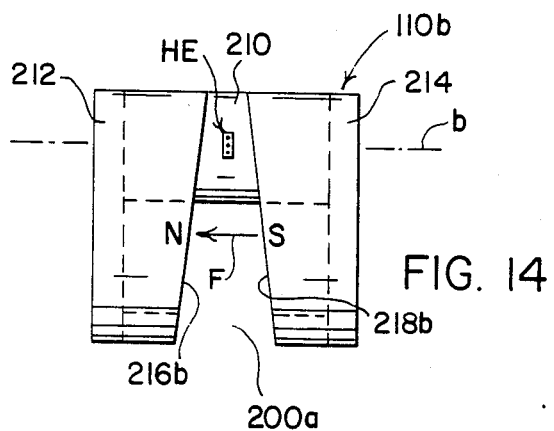
FIG. 14

ANGULAR POSITION TRANSDUCER INCLUDING PERMANENT MAGNETS AND HALL EFFECT DEVICE

The present invention relates to the art of transducers and more particularly to a transducer for monitoring the angular position of a pivoted member, such as the butterfly valve of an internal combustion engine.

INCORPORATION BY REFERENCE

Prior U.S. Pat. Nos. 3,818,292 and 4,156,191 are incorporated by reference herein. Also incorporated is SAE Technical Paper Series No. 810379, February, 1981.

BACKGROUND OF INVENTION

The present invention relates to a transducer which is particularly applicable for use in monitoring the angular position of the butterfly valve of an internal combustion engine for the purpose of providing an electrical signal to be processed by an on-board computer or microprocessor system, and it will be described with particular reference thereto; however, the invention has much broader applications and may be used in various instances where a signal indicative of angular position is to be generated.

In recent years, the automotive industry has been in the process of converting the control system of the standard internal combustion engine to a system which can be controlled by a computer or microprocessor. This type of engine control system monitors various operating conditions of the engine and its appurtenances for assimilation and efficient control of the engine. There has been a substantial demand in the automotive industry for transducers to monitor mechanical and electrical engine conditions to create input signals or data for the on-board computer, microprocessor or other digital processing systems. One parameter which is monitored on an internal combustion engine is the position of the throttle valve associated with the carburetor. As the engine load and speed is to be changed, the angular position of the throttle valve is changed. This valve is hereafter referred to as a butterfly valve. The angular change can be caused by a feedback system, such as a vacuum control system, or by a direct manipulation through the accelerator pedal of the vehicle. Irrespective of the manner in which the butterfly valve is oscillated or pivoted, digital control systems for the internal combustion engine generally require an indication of the angular position of the valve at any given time. In the past this angular position was monitored by a sensor including a fixed housing with an internal resistor. The resistor included a wiper carried on a rotor which was adapted to slide along a conductive disk. Rotating the wiper varied the portion of the resistance of the disk which resulted in the creation of a voltage proportional to the angular position of the rotor. The rotor of the position sensor was driven by an extension on the pivoting shaft of the butterfly valve. Calibration of this sensor could be accomplished by rotating the housing on the carburetor. This type positional sensor sometimes requires an interconnecting linkage or mechanical drive between the shaft of the butterfly valve and the sensor itself. The wear between the wiper of the rotor and the resistance member of the potentiometer reduced the life of the sensor. Also, this constant sliding action caused a certain amount of mechanical inertia resisting movement of the wiper in response to movement of the butterfly valve. Such inertia could result in disproportionate sensing. The drive train would take up slack before a change in signal was indicated by the sensor. Sometimes, the sensor would fail due to a heat deterioration. All of these difficulties rendered existing sensors for indicating the angular position of a butterfly valve in a carburetor less trouble free than desired or demanded.

As will become apparent, the present invention relates to a transducer using a linear Hall Effect device for creating a signal proportional to the angular position of a member, such as the butterfly valve of an internal combustion engine. Such linear Hall Effect devices are known. Various magnet elements have been used to operate the Hall Effect device to indicate position; however, they usually involve a single magnetic pole which has a non-linear relationship of flux density to distance. When two poles of like polarity have been suggested (SAE Technical Paper Series No. 810379, February, 1981) only linear position is monitored. This is general background to the present invention.

THE INVENTION

The present invention relates to a sensor of the type which can be used on the butterfly valve of an internal combustion engine for the purpose of indicating the angular position of the butterfly valve without the disadvantages now experienced in sensors. For instance, the present invention does not have mechanical inertia that can cause false readings, has no relatively moving components which can create wear, and has no rheostat elements which can fail.

In accordance with the present invention, there is provided a transducer for creating an electrical signal proportional to the angular position of a member, such as the butterfly valve of an internal combustion engine, which member is pivotally mounted on a given axis. This transducer comprises a magnetic element that includes a permanent magnet for creating two magnetic poles facing each other across an air gap defined by the poles, wherein the air gap has a flux field created by the permanent magnet means. This flux field varies in strength linearly along a preselected arcuate portion of the air gap in a plane generally perpendicular to a preselected axis. By rotating the magnetic element directly by the member being monitored about the preselected axis and by placing a linear Hall Effect device in the air gap in a manner to be exposed to the field which varies linearly as the magnetic element is pivoted, the output of the Hall Effect device can be monitored and varies according to the angular position of the member driving the transducer. In this manner, the rotating magnetic member does not engage the Hall Effect device. There is no wear or mechanical inertia. The system is free of electrical failures because there is no mechanical or frictional interaction between the operating elements.

In accordance with still a further aspect of the invention, the permanent magnet means defined above includes two permanent magnets with like polarity magnetic poles facing each other. These poles are parallel to each other and oblique with respect to the preselected axis so that, as the magnet member rotates about the axis, the air gap between the two magnets progresses axially. By mounting the Hall Effect device in the air gap between the two like poles, rotation of the magnetic means causes the Hall Effect device to have a varying spacing relative to the two poles. In this manner, the Hall Effect device appears, from an operating standpoint, to progressively shift between the two like poles as the magnet means is rotated. By directly coupling the magnet means with the pivoted member being monitored, the magnet means rotates directly on the same axis as the member being monitored. Thus, there is no need for interconnecting linkages and no mechanical inertia is created in the total operating function of the sensor.

In accordance with another aspect of the present invention, the transducer includes a ratiometric feature wherein the sensor is coupled into a system, such as a microprocessor system, having a nominally varying operating voltage. By using an unregulated linear Hall Effect device and connecting the input voltage of the biasing means on the Hall Effect device with the operating voltage of the system, the percentage change in the output of the Hall Effect device is proportional to the position of the rotating member without substantial variations caused by the system onto which the sensor is connected. Thus, the variation in output for the Hall Effect device is only the variation of the sensor device itself and not variations in the system compounded by the variations of the Hall Effect device. This ratiometric connection of the transducer or sensor constructed in accordance with the present invention produces a more accurate output reading of the angular positions of the member being monitored by the sensor.

The primary object of the present invention is the provision of a transducer or sensor for creating an electrical signal proportional to the angular position of a member, such as the butterfly valve of an internal combustion engine, which transducer or sensor does not have frictionally engaging, relatively movable sensing components.

Still a further object of the present invention is the provision of a transducer or sensor, as defined above, which transducer and sensor has a substantially reduced mechanical inertia and less frictional wear than existing angular sensors.

Another object of the present invention is the provision of a transducer or sensor, as defined above, which transducer and sensor has a relatively long life and produces an accurate output reading indicative of the angular position of a member being monitored.

Yet another object of the present invention is the provision of a transducer or sensor, which transducer or sensor employs a linear Hall Effect device for converting angular movement of a magnetic system into a variable signal.

These and other objects and advantages will become apparent from the disclosure taken together with the accompanying drawings which are discussed in the next section.

BRIEF DESCRIPTION OF DRAWINGS

FIG. 1 is a schematic side elevational view showing, somewhat schematically, a carburetor control system of the type which can use the present invention;

FIG. 4 is a cross-sectional view taken generally along line 4—4 of FIG. 2;

FIG. 5 is a cross-sectional view taken generally along line 5—5 of FIG. 2;

FIGS. 11, 12 and 13 are top, plan and end views, respectively of a modified magnetic system employing a single permanent magnet;

FIG. 14 is a top view, similar to FIG. 11, showing a modification of the embodiment of the invention illustrated in FIGS. 11–13; and, FIGS. 15, 16 and 17 are top, plan and end views, respectively, of a further modified magnetic system utilizing two permanent magnets and useful in the practice of the present invention.

PREFERRED EMBODIMENTS

Figures 2, 3:
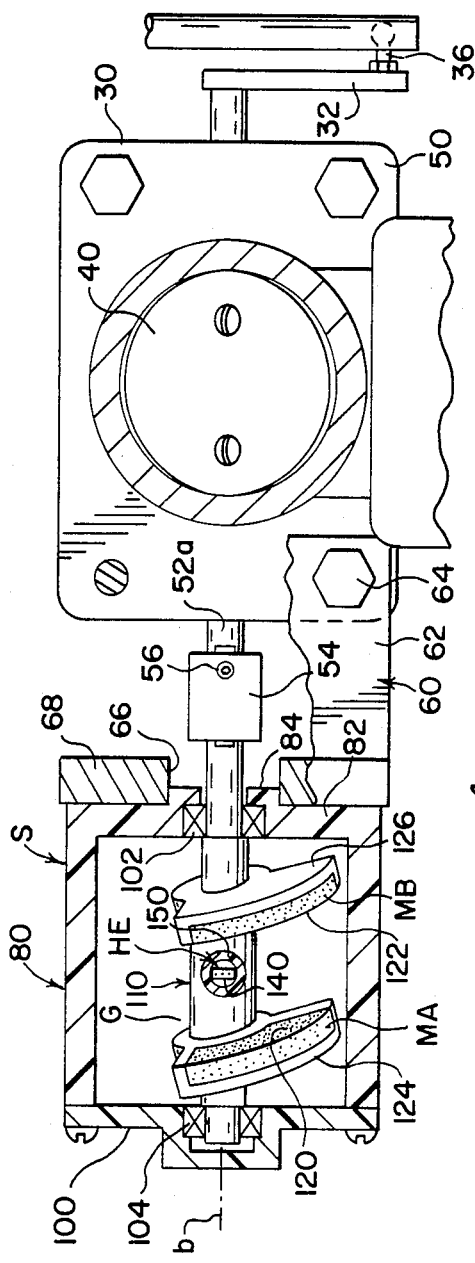
FIG. 2 is an enlarged, partial, cross-sectional view taken generally along line 2—2 of FIG. 1.
FIG. 3 is a cross-sectional view taken generally along line 3—3 of FIG. 2.
Figure 6:
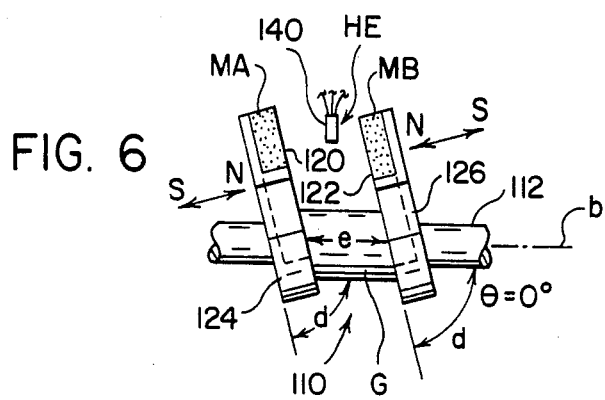
FIG. 6 is a view of the magnetic system employed in the preferred embodiment shown in FIGS. 2–5.

Referring now to the drawings wherein the showings are for the purpose of illustrating a preferred embodiment of the invention only, and not for the purpose of limiting same, FIG. 1 shows a system A for controlling the carburetor in an internal combustion engine having an intake manifold B. This system includes an accelerator pedal 10 pivotally mounted on a motor vehicle cowl C to manipulate a linkage 12 pivotally mounted on a trunnion 14. Bowden cable 20, having an internal shaft 22, is supported between spaced couplings 24, 26 so that downward movement of pedal 10 draws shaft or flexible wire 22 to the right for the purpose of controlling the setting of carburetor 30. This carburetor, in accordance with standard practice, includes a link or lever 32 for the purpose of rotating internal butterfly valve 40, shown in FIGS. 2 and 3. A tension spring 34 holds lever 32 in the counterclockwise position from which lever 32 can be moved by shaft 22 through a universal coupling 36 and draw bar or link 38. As so far described, system A is a representative type of system for controlling the angular position of butterfly valve 40 in response to movement of pedal 10. The present invention relates to a sensor S which functions as a transducer for creating an electrical signal indicative of the angular position of butterfly valve 40 as it is rotated on shaft 52 about axis a in carburetor housing 50. Shaft 52 is journaled within housing 50 in accordance with standard practice and includes a stub shaft or extension 52a to be coupled with sensor S through an appropriate coupling 54 held in place by set screw 56. To mount sensor S onto carburetor housing 50 there is provided a mounting bracket 60 having a transversely extending flange 62 which is secured to carburetor 30 by bolts 64. Bracket 60 also includes a central opening 66 on a downwardly extending plate 68. Circular opening 66 corresponds with axis a of shaft 52. Plate 68 is generally perpendicular to axis a so that shaft 52 rotates about an axis extending into sensor S through opening 66. Fixed bolt holes 70 on outboard portions of plate 68 are used to secure generally cylindrical sensor housing 80 in an adjustable position with respect to plate 68 and thus axis a of shaft 52. In the illustrated embodiment, cylindrical housing 80 is cup-shaped and has a closed mounting end 82 with an outwardly extending boss 84 that matches opening 66 so that housing 80 is concentric with axis a. Arcuate slots 90, 92 concentric with axis a are adapted to receive calibrating bolts 94, 96. By loosening these bolts, housing 80 can be rotated about opening 66 on boss 84 to adjust, or calibrate, the angular position of sensor S with respect to butterfly valve 40. Housing 80 is closed by a cover 100 held onto the left side of housing 80 by a plurality of bolts 101. Spaced ball bearings 102, 104 supported in housing 80 and cover 100, respectively, rotatably support internal, movable magnet element 110, best shown in FIG. 6. This element is molded plastic and rotates about shaft 112 on a preselected axis b, which axis is coincident with axis a. Consequently, element 110 rotates in unison with shaft 52 without intermediate mechanical linkages. This is a direct drive of shaft 112 by shaft 52. Coupling 54 joins the two shafts in mutual alignment. In practice, this coupling is a universal coupling to accommodate slight misalignments between axis a and axis b. Shaft 112 of movable element 110 is non-magnetic and supports two axially spaced permanent magnet sectors MA, MB. These magnets, in practice, are formed by rare earth material and are manufactured and sold by Hitachi Magnetics Corporation, Edmore, Mich. under the designation HICOREX 90A. These rare earth permanent magnets are sintered to the desired shape as set forth in FIGS. 5 and 6. This shape is a sector of a circle having flat, like polarity magnetic poles 120, 122, both of which are North in the preferred embodiment. These magnets are magnetized perpendicular to surfaces 120, 122 as shown by the arrows in FIG. 6. As can be seen, magnets MA, MB have their surfaces or poles 120, 122 parallel to and facing each other and skewed at an angle d with respect to axis b. They are held in this position by being mounted in plastic fan-shaped holders 124, 126. Spacing e, in practice is approximately 0.25 inches. This defines air gap G between parallel surfaces 120, 122. In the plane perpendicular to axis b there is mounted a linear Hall Effect device HE having standard leads 130, 132 and 134. This Hall Effect device is manufactured by Sprague Electric Company of Concord, N.H. with a product number UGN-3501 T. Hall Effect device HE is fixed at a location in gap G and is progressively shifted with respect to surfaces 120, 122 as the skewed magnets MA, MB are rotated about axis b. Thus, by rotating shaft 112 about axis b, Hall Effect device HE, from a magnetic or operation standpoint progresses between surfaces 120, 122 in a direction parallel to axis b. Device HE is located with respect to these two surfaces in accordance with the existing angular position of shaft 112. This shaft is driven directly by shaft 52 which supports butterfly valve 40. Thus, the relative position of device HE with respect to magnetic poles or surfaces 120, 122 is directly related to the rotational or angular position of butterfly valve 40. In accordance with standard practice, device HE has a sensing surface or cell which is denoted by the branded surface of the device. Device HE is potted within non-magnetic receptacle 150 and is sealed in position at joint 152. By orienting sensing surface 140 to face toward the left, as shown in FIGS. 3 and 6, the output at lead 134 is indicative of the angular position of butterfly valve 40 as determined by the relative spacing of surface 140 with respect to the parallel, like polarity magnetic pole surfaces 120, 122.

Figure 7:
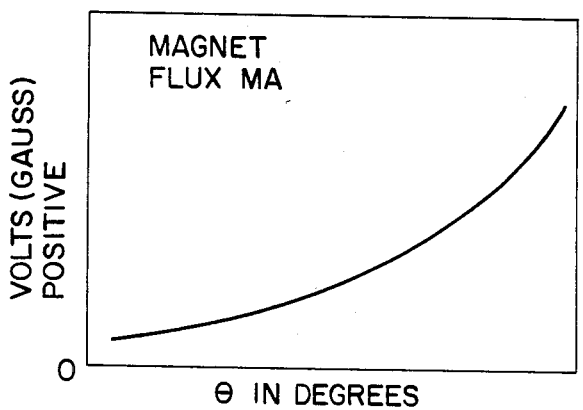
FIGS. 7 and 8 are graphs illustrating the relationship between rotation of the magnet system of FIG. 6 as it relates to separate spaced, skewed magnets on a single shaft.
Figure 8:
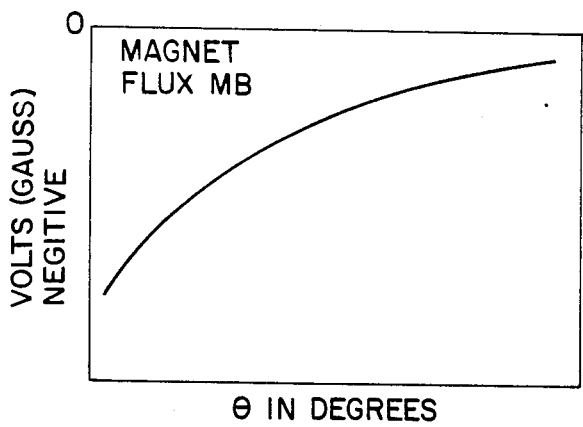
Figure 9:
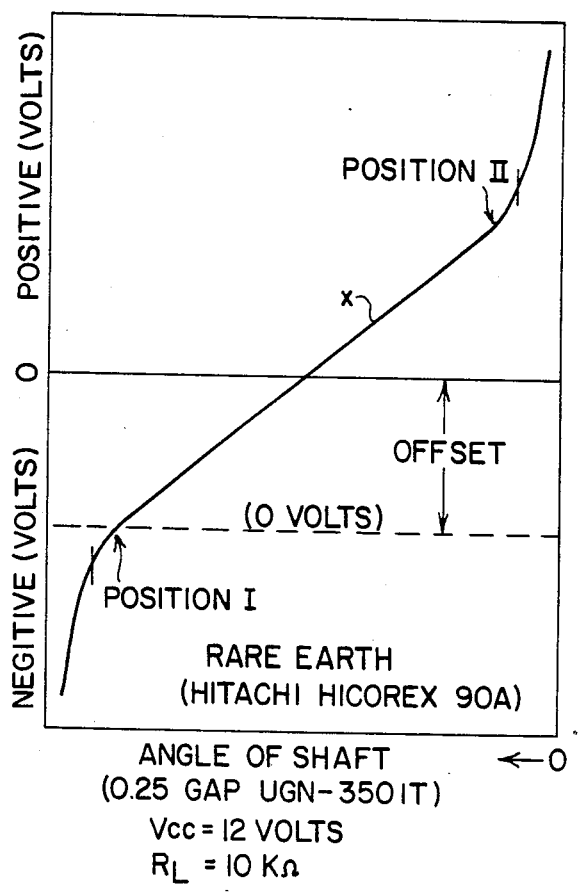
FIG. 9 is a combined graph showing the operating characteristics of the magnetic system shown in FIG. 6, as it relates to the voltage output from a linear Hall Effect device employed in the system shown in FIG. 6.

Referring now to FIGS. 7 and 8, these figures schematically represent the flux density at sensing surface or cell 140 for North magnetic poles or surfaces 120, 122, respectively, as shaft 112 is rotated by shaft 52. Since like poles are facing each other, the magnetic field between surface 120, 122 is subtractive and creates a generally straight line flux field relationship as the spacing between the respective pole surfaces varies. In sensor S, the angular position of butterfly valve 40 is represented by the abscissa. This combined flux field relationship is schematically illustrated in FIG. 9 wherein curve x is the combined flux field profile through gap G between surfaces 120, 122. The angular position of magnets MA, MB does not affect curve x; however, the angular position changes the location of device HE along curve x. Magnets MA, MB produce a generally straight line portion between extreme angular positions represented as I, II. By adjusting the voltage offset of the voltage created in line 134, a straight line portion of curve x between positions I, II can exist that has a positive output voltage from device HE. The voltage offset controls the operating level of voltage at line 134 by shifting the zero voltage position to approximately position I. In FIG. 9, the voltage output from Hall Effect device HE is varied from a minimum angle to the right of the graph to a maximum angle to the left of the graph. Of course, these relationships are all relative and can be reoriented so that the output along the constant slope portion of curve x is the working arc of the sensor S. In practice, this arc is less than approximately 90°.

Figure 10:
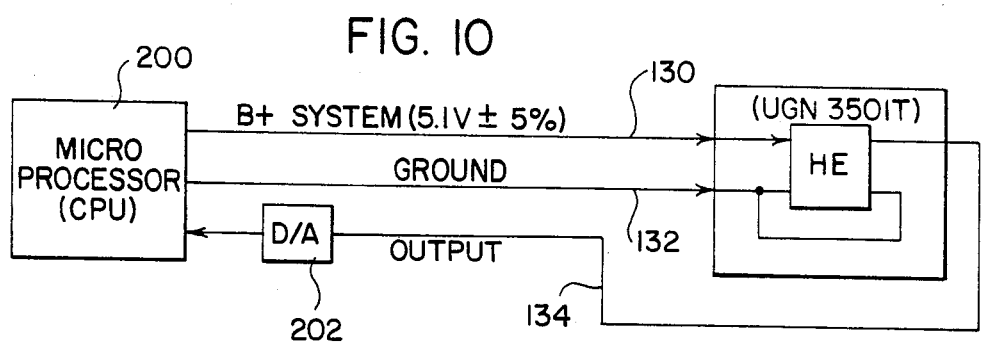
FIG. 10 is a wiring diagram illustrating the ratiometric concept employed in one aspect of the present invention.

Referring now to FIG. 10, the motor vehicle using system A is illustrated as including a microprocessor 200, which microprocessor system includes a positive bus B+ connected to lead 130 and a ground or chassis ground bus connected to terminal or lead 132. The input of the Hall Effect device is generally regulated or biased at 9.5 volts. In accordance with the concept illustrated in FIG. 10, linear Hall Effect device HE does not have a regulated input. The biasing voltage is controlled directly by system bus B+ as connected to leads 130. In this manner, the output in line 134 is affected by the flux changes at surface 140 according to the slight variations in the regulated positive bus B+ of microprocessor system 200. This system receives the output from an analog to digital converter 202 which is controlled by the analog voltage in line 134. Thus, the input from converter 202 as read in digital fashion by microprocessor system 200 fluctuates only in accordance with fluctuation in the positive voltage bus of system 200. This gives a ratiometric control over the function of linear Hall Effect device HE in that the combined regulation and system variations are not magnified in the resulting output voltage in line 134.

The skewed, parallel permanent magnets having like polarity magnetic poles facing each other, as shown in FIGS. 2-6, are preferred; however, FIGS. 11-13 illustrate a magnetic element 110a which employs a single magnet 210 in the form of a sleeve axially magnetized to produce opposite polarity magnetic poles on spaced ends of the sleeve. Pole shoes 212, 214 are arcuate segments, as best shown in FIG. 13. Extending from these segments at the position concentric with and spaced from axis b, extensions or arcuate ribs 216, 218 are provided. These ribs have edges 216a, 218a which define an intermediate air gap 220. In this embodiment, arcuate edge or surface 216a generally lies in a plane perpendicular to axis b. Edge or surface 218a is arcuate and tapers away from edge 216a so that flux field F is progressively decreased between positions m, n in a linear fashion along an arcuate operating line concentric with axis b. This contouring of opposite polarity magnetic poles defined by edges 216a, 218a to provide a linear variation of field F allows the Hall Effect device HE to be subjected to progressively varying field strength in gap 220 as element 110a is rotated by shaft 52. This same general arrangement is illustrated in a further embodiment of the invention as shown in FIG. 14. In this embodiment, magnet element 110b includes a single sleeve magnet 210 with an operating gap 200a which is defined by outwardly diverging edges 216b, 218b. These edges are contoured so that the flux field F progressively changes in strength as edges 216b, 218b are shifted along in an arcuate path or operating line determined by the angular position of butterfly valve 40 supported on shaft 52.

Figure 15:
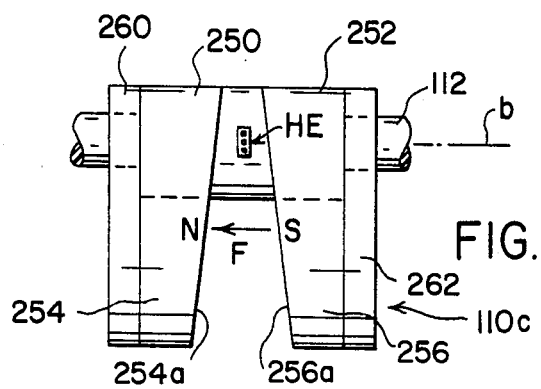
Figure 16:
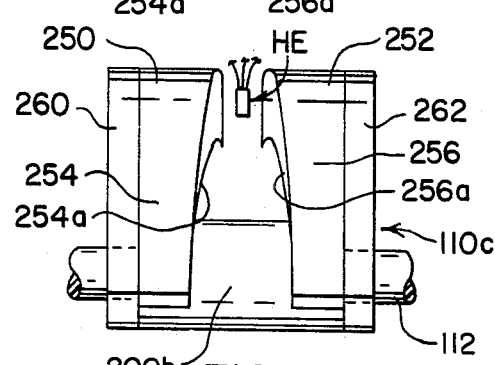
Figure 17:
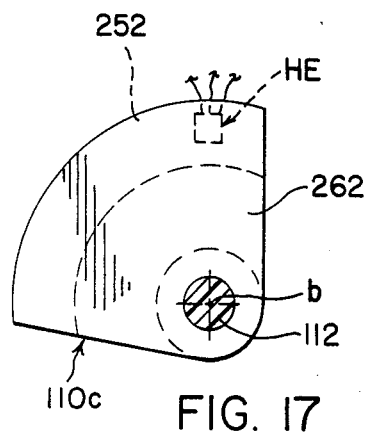

The embodiment shown in FIGS. 11-13 and the embodiment shown in FIG. 14 have a central gap with a controlled flux field to cause a progressive change in the flux field strength exposed to Hall Effect HE as the magnetic elements 110a, 110b are pivoted. Each of these elements includes a single permanent magnet and the gap has opposite polarity magnetic poles on each edge. This obtains the same overall function as the preferred embodiment wherein two separate permanent magnets MA, MB are mounted with like polarity magnetic pole surfaces facing each other. In this arrangement, flux field F is based upon the spacing between poles and device HE progresses between the two pole surfaces so that the change in the relative position exposes sensing surface 140 to a varying flux density or field strength as element 110 is rotated. A combination of these two concepts is employed in the embodiment shown in FIGS. 15-17 wherein permanent magnet element 110c includes two arcuately shaped permanent magnets 250, 252 having arcuate pole faces 254, 256, respectively. These pole faces are concentric with axis b and are assembled so that opposite polarity magnetic poles 254a, 256a define the intermediate operating gap 200b. This gap is progressively increased as shown in FIG. 15 so that flux field F varies in accordance with the angular position of element 110c as controlled by the angular position of butterfly valve 40. Other arrangements could be incorporated for allowing the linear Hall Effect device HE to be exposed to a linearly varying flux field or flux density as a movable element is progressively rotated directly by shaft 52. Thus, in the preferred embodiment, there is no interconnecting links or driving elements to shift the permanent magnets with respect to linear Hall Effect device HE. Elements 110, 110a, 110b and 110c are all directly driven on the same axis as shaft 52. Hall Effect device HE is always in the gap which prevents frictional wear or other operating features which would cause mechanical failure.

It is possible to use various permanent magnets, such as Alnico and ceramic magnets to practice the invention. Also, electromagnets could be employed with variations made by the magnitude of the energizing current. The terms throttle valve and butterfly valve are used interchangeably. In practice, the field varies proportionally to the angular position; however, other relationships can be used.

Having thus described the invention, the following is claimed:

1. A transducer for creating an electrical signal proportional to the angular position of a member pivotally mounted on a given axis, said transducer comprising: an element pivoted directly by said member and containing a means for creating a flux field linearly varying in intensity along a given operating line extending in an air gap between two spaced portions of said operating line and having a preselected shape; a linear Hall Effect device with an output voltage proportional to the intensity of the flux field to which said device is exposed; and, means for mounting said Hall Effect device at a fixed position on said operating line and in said air gap whereby as said element is pivoted by said member to cause relative movement of said Hall Effect device along said operating line, said output voltage varies proportionally to the instantaneous position of said Hall Effect device along said operating line, wherein said flux field creating means is two permanent magnets each having opposite polarity poles and means for mounting said two magnets with like polarity poles of the magnets facing each other across said air gap, said magnets being mounted to rotate about a preselected axis, said like poles are generally parallel and at an angle with said preselected axis, and said operating line extends in a plane orthogonal to said preselected axis.

2. A transducer for creating an electrical signal proportional to the angular position of a member pivotally mounted on a given axis, said transducer comprising: a magnetic element, said element including a permanent magnet means for creating two magnetic poles facing each other and defining therebetween an arcuate air gap extending concentrically about a preselected axis, said magnet means creating a flux field within and directed across said air gap which varies in strength across said gap linearly along a preselected arcuate portion of said gap concentric with and in a plane normal to said preselected axis; means for mounting said magnetic element for rotation directly by said member about said preselected axis whereby said preselected arcuate portion of said gap is moved past a preselected position therein as said member pivots about said given axis; a linear Hall Effect device having a signal creating output and a flux field responsive cell; and, means for mounting said Hall Effect device with said cell at said preselected position, said permanent magnet means including two permanent magnets with surfaces defining like polarity poles, said like polarity poles facing each other and extending in a direction corresponding to said arcuate gap, and said surfaces defining said like polarity poles being generally parallel to each other and at an angle to said preselected axis whereby said surfaces move away from and toward said preselected position as said member pivots.

* * * * *